US008208131B2

(12) United States Patent
Schilling et al.

(10) Patent No.: US 8,208,131 B2
(45) Date of Patent: Jun. 26, 2012

(54) DIGITAL REGISTRATION OF 3D LASER RADAR DATA BASED ON MANUALLY SELECTED FIDUCIALS

(76) Inventors: Bradley W. Schilling, Fredericksburg, VA (US); Brian W. Thomas, Reston, VA (US); Dallas N. Barr, Woodbridge, VA (US); Charlie W. Trussell, Woodbridge, VA (US)

( * ) Notice: Subject to any disclaimer, the term of this patent is extended or adjusted under 35 U.S.C. 154(b) by 132 days.

(21) Appl. No.: 12/828,318

(22) Filed: Jul. 1, 2010

(65) Prior Publication Data

US 2012/0001789 A1    Jan. 5, 2012

(51) Int. Cl.
*G01C 3/08* (2006.01)
(52) U.S. Cl. ....... 356/5.01; 356/3.01; 356/5.1; 356/5.04
(58) Field of Classification Search ....... 356/3.01–139.1
See application file for complete search history.

(56) References Cited

U.S. PATENT DOCUMENTS

| 6,414,746 | B1 | 7/2002 | Stettner et al. | |
| 2002/0060784 | A1* | 5/2002 | Pack et al. | 356/6 |
| 2007/0052947 | A1 | 3/2007 | Ludwig et al. | |
| 2008/0246943 | A1* | 10/2008 | Kaufman et al. | 356/5.01 |

OTHER PUBLICATIONS

B. W. Schilling, D. N. Barr, G. C. Templeton, L. J. Mizerka, C. W. Trussell, "Multiple-return laser radar for three-dimensional imaging through obscurations" Appl. Opt. 41, 2791-2799 (2002).
C. W. Trussell, "3D imaging for Army applications," in Laser Radar and Technology Applications VI, G. W. Kamerman, ed., Proc. SPIE 4377, 126-131 (2001).
C. W. Trussell, D. N. Barr, B. W. Schilling, G. C. Templeton, L. J. Mizerka, C. Warner, R. Hummel and R. Hauge "Multi-aspect high-resolution ladar data collection", Proceedings SPIE 5086, pp. 104-111 (2003).

D. Ludwig, et. al., "Identifying targets under trees: jigsaw 3D ladar test results," in Proceedings of SPIE vol. 5086 Laser Radar Technology and Applications VIII, edited by Gary W. Kamerman (SPIE. Bellingham, WA, 2003) pp. 16-26.
A. Gelbart, C. Weber, S. Bybee-Driscoll, j. Freeman, G. J. Fetzer, T. Seales, K. A. McCarley, J. Wright, "FLASH Lidar data collections in terrestrial and ocean environments," in Proceedings of SPIE vol. 5086 Laser Radar Technology and Applications VIII, edited by Gary W. Kamerman (SPIE. Bellingham, WA, 2003) pp. 27-38.
S. Hsu, S. Samarasekera and R. Kumar, "Automatic registration and visualization of occluded targets using ladar data," in Proceedings of SPIE vol. 5086 Laser Radar Technology and Applications VIII, edited by Gary W. Kamerman (SPIE. Bellingham, WA, 2003) 209-220.
B. L. Stann, W. C. Ruff, Z. G. Sztankay, "Intensity-modulated diode laser radar using frequency-modulated/continuous-wave ranging techniques," Opt. Eng. 35(11) 3270-3278 (Nov. 1996).
B. L. Stann, et. al., "Research progress on a focal plane array ladar system using chirped amplitude modulation," in Proceedings of SPIE vol. 5086 Laser Radar Technology and Applications VIII, edited by Gary W. Kamerman (SPIE. Bellingham, WA, 2003) pp. 47-57.
M. A. Albota, et. al., "Three-dimensional imaging laser radar with a photon-counting avalanche photodiode array and microchip laser," Appl. Opt. 41, 7671-7678 (2002).

* cited by examiner

*Primary Examiner* — Luke Ratcliffe
(74) *Attorney, Agent, or Firm* — Richard J. Kim (57) ABSTRACT

A system and method for registering 3D data sets is disclosed based on manual fiducial selection. The technique is useful in imaging obscured targets with 3-D imaging laser radars. For such an exemplary method, which defines a three-dimensional linear shift vector for each data voxel, four fiducials are required to completely define the mapping for a 3D space. An exemplary registration algorithm as disclosed provides an approach to automatically make fine adjustments to the 3D data registration. The tedious technique of shifting data sets relative to each other, in many degrees of freedom, is eliminated. Instead, a fine adjust is applied to the digital mapping function, through fiducial perturbation.

9 Claims, 12 Drawing Sheets

DIGITAL REGISTRATION OF 3D LASER RADAR DATA BASED ON MANUALLY SELECTED FIDUCIALS

GOVERNMENT INTEREST

The invention described herein may be manufactured, used, sold, imported, and/or licensed by or for the Government of the United States of America.

FIELD OF THE DISCLOSURE

The disclosure relates to imaging obscured targets using three-dimensional (3D) imaging laser radar.

BACKGROUND INFORMATION

In the past, numerous targeting scenarios have been investigated. Usually, laser radar data is recorded of a target or scene that is obscured by foliage, camouflage netting, or other obscurations. The data acquisition process is repeated for the same target, but from different locations, or view-points. A frequency-modulated ladar can be used to study the problem and record multi-aspect laser radar imagery.

One of the most straightforward techniques for registering 3D data is to calculate the actual physical location of the voxels in each data set. Other researchers have successfully "stitched together" multi-aspect laser radar data by this technique. A potential drawback of this straightforward method is the necessity for precise positioning information, such as the location of the laser radar transceiver at the time of acquisition, the location of some object clearly visible in the scene, and/or the precise pointing direction of the acquisition system. Precise and absolute positioning information may be difficult to acquire, require special equipment, or simply not be available in some cases. For this reason and others, purely databased registration techniques are being developed for three-dimensional data sets. Researchers from Sarnoff Corporation have successfully registered multi-aspect laser radar data sets of occluded objects with a technique that is data-driven and automatic.

A key aspect of the general concept is the capability to register and combine the three-dimensional data without the difficulties of using special equipment or not being able to acquire the data at all. Therefore, there is a need in the art to overcome these difficulties.

SUMMARY

The disclosure relates to registering 3D data sets to map obscured objects based on scene fiducials, where a fiducial is defined as an easily identifiable physical reference point common to each data set. The fiducials are used as anchor points to create a digital mapping relating two or more data sets. An exemplary embodiment defines a three-dimensional linear shift vector for each data voxel, wherein four fiducials are used to completely define the mapping for a 3D space. Using an exemplary registration algorithm as disclosed provides a novel approach to automatically make fine adjustments to the 3D data registration. The tedious technique of shifting data sets relative to each other, in many degrees of freedom, is eliminated. Instead, a fine adjust is applied to the digital mapping function, through fiducial perturbation.

Accordingly, in one aspect, a digital registration of 3D laser radar data is disclosed for imaging processing based on selected fiducials using a laser radar system. Such a digital registration comprises: raster scanning by a scanner of the laser radar system a target from at least two different positions; using predetermined fiducials to create a digital mapping relating the raster scans from the at least two different positions to each other; defining a three-dimensional linear shift vector for data voxels from the digital mapping; and image mapping using the three-dimensional linear shift vector to improve target-identification of an obscured target.

In another aspect, a registration algorithm is disclosed to process 3D laser radar data sets using a computing device to map obscured objects based on fine adjustments to the 3D data registration. Such a registration algorithm comprises: defining fiducials based on an imaged reference point identifiable in each data set; using the fiducials as anchor points to create a digital mapping relating two or more data sets; and defining a three-dimensional linear shift vector for each data voxel to allow fine adjustments to the 3D data registration and improve target-identification of an obscured target.

The present disclosure is based on identifying a target by accumulating data collected through the small gaps in the foliage canopy or camouflage net with a 3D imaging laser radar. Even for heavy (but not complete) obscuration, some amount of laser radiation will pass through gaps and scatter at the target, resulting in a limited number of target-voxels in any single data set. Subsequent laser radar data acquisitions of the same target area, but from varying positions, will each pass through a different set of holes in the foliage, resulting in an independent collection of target-voxels. As target-voxels from different data acquisitions are registered and accumulated, a complete 3D representation of the target may be constructed. Once the data is registered, 3D laser radar data acquired from differing aspect angles improves the target-identification capability of heavily obscured targets.

Accordingly, yet in one aspect, a 3D laser radar system is disclosed based on a laser transceiver sensor system. Such a 3D laser radar system comprises: producing nominal pulses of laser from a microchip towards scanners, the scanners being computer controlled to scan a monostatic transceiver field of view directed towards a scene having an obscured target, wherein said scanning yields at least one data set relating to said obscured target acquired from one location during one time period, and another data set relating to said obscured target acquired from another location during another time period; reflecting a returning radiation from the scene by a polarization beam splitter for focusing on a preamplifier module, wherein a post-amplifier further amplifies the output of the preamplifier module; digitizing said amplified output for input to a computing device to acquire data from differing aspect angles; computer processing data from one 3D imaging laser radar location at one aspect angle, wherein the target is obscured such that some amount of laser radiation passes through and scatter at the target; identifying the target by accumulating one data set acquired from said one 3D imaging laser radar location based on said laser radiation scattered at the target, resulting in a limited number of target-voxels; computer processing another data set from another 3D imaging laser radar location at another aspect angle, wherein the target obscuration from said another aspect angle is such that another amount of another laser radiation passes through another set of gaps and scatter differently at the target; identifying the target by accumulating said another data set acquired from said another 3D imaging laser radar location, resulting in a differing number of target-voxels in the another data set; and as target-voxels from different data acquisitions are registered and accumulated, constructing a complete 3D representation of the obscured target, wherein the 3D representation of the obscured target acquired from differing aspect angles improves identification of the obscured target.

BRIEF DESCRIPTION OF THE DRAWINGS

These and other objects of the disclosure will become readily apparent in light of the Detailed Description and the attached drawings wherein.

DETAILED DESCRIPTION

Laser Radar and 3D Data Collection

Figure 2:
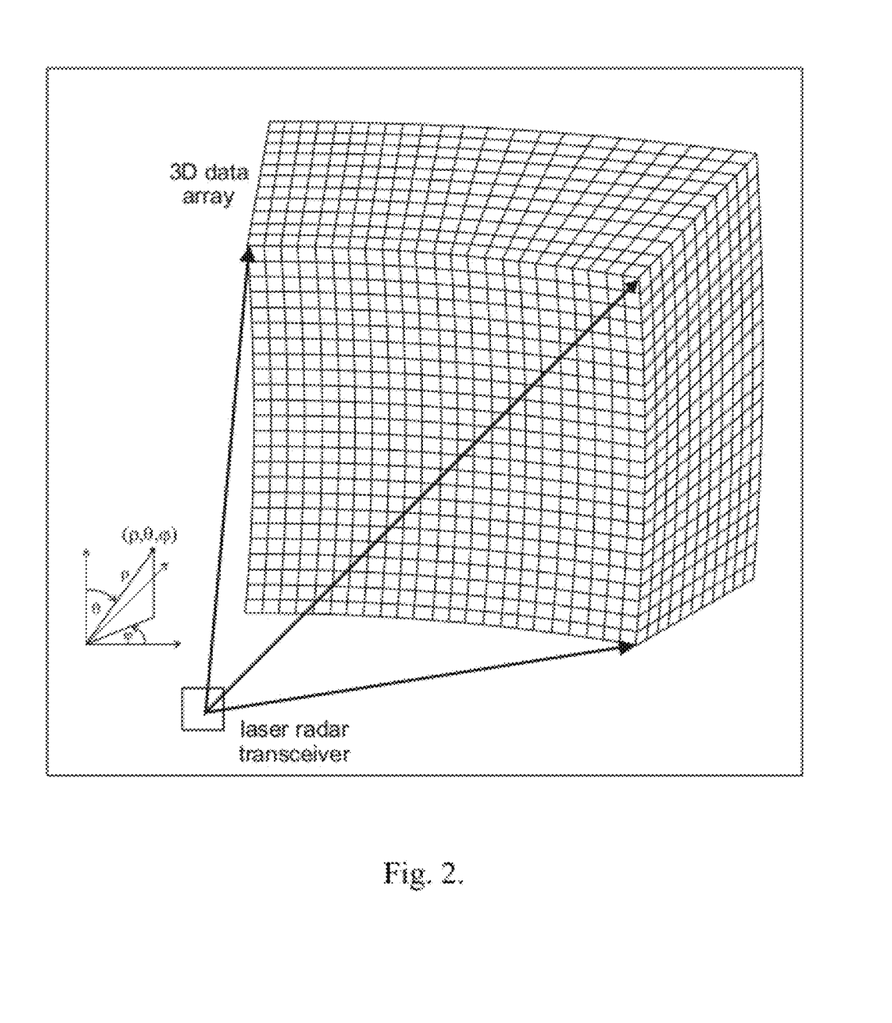
FIG. 2 shows an exemplary imaging laser radar records data in a regularly spaced 3D array wherein each data point, called a voxel, has a truncated pie shape.

A short-pulsed, direct-detection, scanning laser radar is disclosed to record and process 3D data. Such a ladar system can be based on a single laser, single detector, common-aperture architecture. An exemplary ladar system (e.g., 100) employs a diode pumped, passively Q-switched, Nd:YAG, micro-chip laser (e.g., 110) capable of emitting short laser pulses (on the order of about ~1.2 nanosecond) of high peak power (e.g., 5 kW). In one exemplary embodiment, two galvanometer-scanning mirrors (e.g., 150) direct the laser radiation (e.g., 101) to the area of interest, scanning the scene in a raster fashion. The laser radar return signals (e.g., 102)) are detected by a photodiode 160, e.g., an InGaAs avalanche photodiode, and then amplified, digitized and stored, e.g., in a computer 190 storage device. This data results in a regularly spaced 3D array representing the volume of interest, as shown in FIG. 2.

Figure 1A:
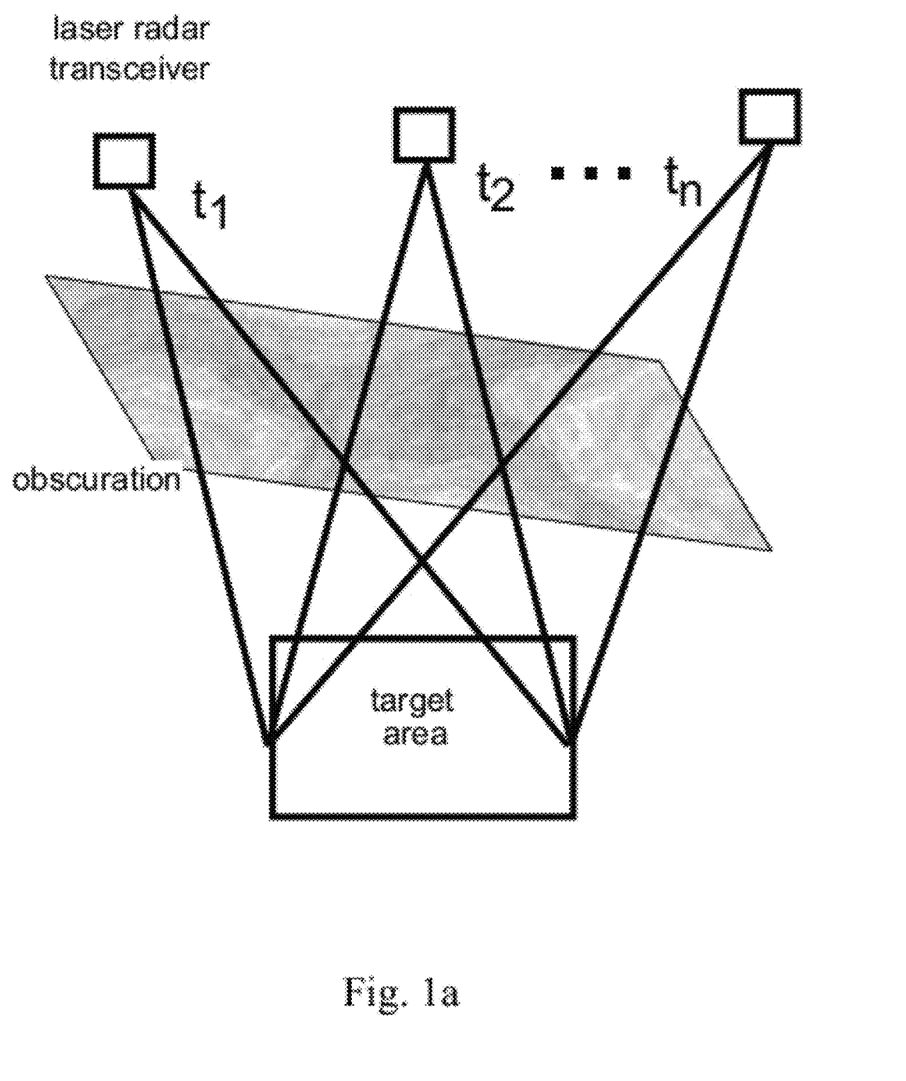
FIG. 1a is an exemplary schematic illustration of the multiple aspect data collection of an obscured target by imaging laser radar.
Figure 1B:
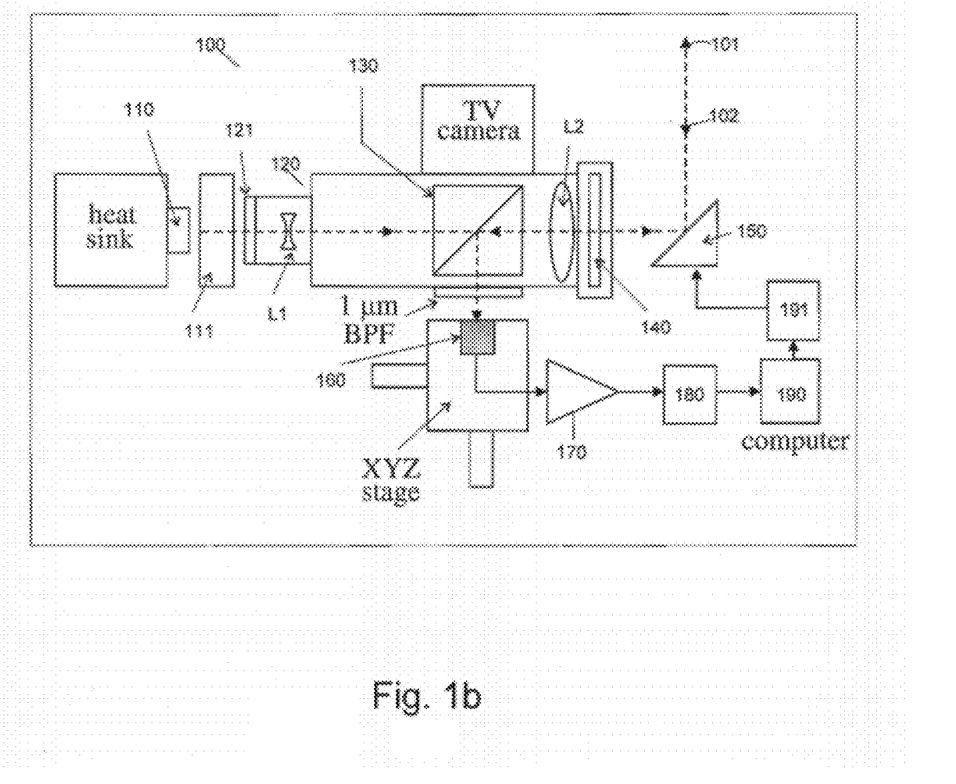
FIG. 1b shows an exemplary optical layout of an laser transceiver sensor system for data collection of obscured target.

An exemplary embodiment is shown as a laser transceiver system in FIG. 1b. Further, FIG. 1b shows an exemplary optical layout of such a laser transceiver sensor system 100 in which a Nd:YAG microchip laser (e.g., 110) produces nominal pulses, e.g., one nanosecond pulses at a rate of three kilohertz. A computer-controlled shutter 111 can remain closed, for safety, until the scanners (e.g., 150) are active. This results in an eye safe range, e.g., of about 35 meters. A filter (e.g., 121) at the entry aperture of a telescope (e.g., 120) can block diode laser pump radiation. A diverging lens (e.g., L1) serves as the telescope secondary optic and after passing through a polarization beam splitter (e.g., 130) the beam divergence is reduced to about 100 micro radians by the primary lens (e.g., L2). The linearly polarized radiation is converted to circular polarization by the quarter wave plate (140) that is the last element of the optical path before the scanners (e.g., 150). The galvo scanners (e.g., 150) can be computer (e.g., 190) controlled, e.g., via a D/A converter 191, to scan a monostatic transceiver field of view, e.g., in 0.5 milliradian steps. Returning radiation (e.g., 102) from the scene is reflected from the polarization beam splitter (e.g., 130) and focused on a preamplifier module 160 having, e.g., a 2.5 GHZ bandwidth (e.g., based on an InGaAs avalanche photodiode). The focal length of the primary lens (e.g., L2) can be nominally 100 millimeters and the detector (e.g., 160) can have a 30 micron diameter so the field of view of the receiver is about 300 micro radians. A post-amplifier (e.g., 170), e.g., that has a bandwidth of 500 MHz, can further amplify the output of a detector/preamplifier (e.g., 160). An RF splitter can divide the signal for delivery to an oscilloscope and an A/D converter 180 (e.g., an eight bit computer digitizer that samples at 2 Gs/s) for input to a computing device (e.g., 190). Such an input data can be processed by the computing device 190 to result in a regularly spaced 3D array representing the volume of interest, as shown in FIG. 2.

Accordingly, an exemplary 3D laser radar system can be based on such a laser transceiver sensor system. An exemplary 3D laser radar system comprises: producing nominal pulses of laser from a microchip towards scanners, the scanners being computer controlled to scan a monostatic transceiver field of view directed towards a scene having an obscured target, wherein said scanning yields at least one data set relating to said obscured target acquired from one location during one time period, and another data set relating to said obscured target acquired from another location during another time period; reflecting a returning radiation from the scene by a polarization beam splitter for focusing on a preamplifier module, wherein a post-amplifier further amplifies the output of the preamplifier module; digitizing said amplified output for input to a computing device to acquire data from differing aspect angles; computer processing data from one 3D imaging laser radar location at one aspect angle, wherein the target is obscured such that some amount of laser radiation passes through and scatter at the target; identifying the target by accumulating one data set acquired from said one 3D imaging laser radar location based on said laser radiation scattered at the target, resulting in a limited number of target-voxels; computer processing another data set from another 3D imaging laser radar location at another aspect angle, wherein the target obscuration from said another aspect angle is such that another amount of another laser radiation passes through another set of gaps and scatter differently at the target; identifying the target by accumulating said another data set acquired from said another 3D imaging laser radar location, resulting in a differing number of target-voxels in the another data set; and as target-voxels from different data acquisitions are registered and accumulated, constructing a complete 3D representation of the obscured target, wherein the 3D representation of the obscured target acquired from differing aspect angles improves identification of the obscured target.

Digital sampling (e.g., 180) and storage of the entire return signal over a time period of interest as disclosed yields an enhanced computer processing capability to detect objects in a target area behind or through partial obscurations as exemplified in FIG. 1a, which, in turn, results in a more completely filled 3D array of data as may be represented on a computing device 190. A typical laser radar data set as may be processed by a computing device 190 consists of a regularly spaced 3D array of truncated pie-shaped voxels containing 8-bit intensity values. The total physical volume interrogated by the laser radar is determined in θ and ϕ by the scanning voltages and in p by the digitization length of the avalanche photo-diode signal. In the lateral dimensions, the sampling resolution is determined by the number of points stored for each line scan in θ, and in ϕ by the number of lines scanned. The sampling resolution along the depth dimension is dependant on the digitization frequency ($f_d$) of the return signal. Laser radar data can be displayed in a number of ways, including a 2D intensity image, a 2D range mapping, and a full 3D rendering of the entire volume of data. Somewhat inherent in the 3D nature of laser radar data is the ability to display multiple range bins to show a specific range-gated volume of interest. This range gating technique is often employed to avoid displaying obscurations and clutter that can be separated based on range information.

In one aspect, the following disclosure includes a digital registration of 3D laser radar data for imaging processing based on selected fiducials using a laser radar system (see, FIGS. 1a and 1b). Such a digital registration comprises: raster scanning by a scanner (e.g., 150 of FIG. 1b) of the laser radar system a target from at least two different positions (e.g., $t_1$, $t_2$, etc. of FIG. 1a); using predetermined fiducials to create a digital mapping relating the raster scans from the at least two different positions to each other; defining a three-dimensional linear shift vector for data voxels from the digital mapping; and image mapping using the three-dimensional linear shift vector to improve target-identification of an obscured target (e.g., target area of FIG. 1a).

In another aspect, the following disclosure includes a registration algorithm to process 3D laser radar data sets using a computing device (e.g., 190) to map obscured objects based on fine adjustments to the 3D data registration. Such a registration algorithm comprises: defining fiducials based on an imaged reference point identifiable in each data set; using the fiducials as anchor points to create a digital mapping relating two or more data sets; and defining a three-dimensional linear shift vector for each data voxel to allow fine adjustments to the 3D data registration and improve target-identification of an obscured target (e.g., target area of FIG. 1a).

Three Dimensional Data Registration Algorithm

A. Heuristic Description

The data registration algorithm of the present disclosure can be implemented as a computer program for processing by a computing device (e.g., 190) to operate on two or more three-dimensional data sets, e.g., data sets A and B. As shown in FIG. 1a, a plurality of laser radar data sets represent the same target area but have been acquired from different transceiver locations. For instance, with regard to FIG. 1a, data set A may be acquired at time $t_1$, while data set B is acquired from a different location and time, say $t_2$. Next, consider a specific voxel from data collection A, referenced (only) to data set A, designated ($X_A$, $Y_A$, $Z_A$), after conversion to Cartesian coordinates. Since the data in B represent the same physical location in space, there will be a corresponding voxel in data set B, referenced to data set B, as ($X_B$, $Y_B$, $Z_B$), that designates the same physical location in space. Physical data points that are easily recognizable in both data sets are considered reference points, and are referred to as fiducials. The voxel representing a fiducial, $F_1$, from data set A can therefore be related to the voxel corresponding to $F_1$ in data set B through a mapping or shift vector, ($\delta_{x1}$, $\delta_{y1}$, $\delta_{z1}$) where $\delta_{x1} = X_B - X_A$, $\delta_{y1} = Y_B - Y_A$, $\delta_{z1} = Z_B - Z_A$.

This correspondence can be made even though ($x_A$, $y_A$, $z_A$) and ($x_B$, $y_B$, $z_B$) exist in different reference frames and different coordinate systems. The corresponding voxels from each data set are defined to represent the same physical location to be companion voxels. It follows that for any voxel in data set A, there is a companion voxel in data set B that can be accessed by applying some shift ($\delta_{xn}$, $\delta_{yn}$, $\delta_{zn}$), (except near the edges of the data sets, where physical overlap may not take place).

The identification of a second fiducial in each data set defines not only the shift vector associating companion voxels for the two fiducials, but through linear interpolation, the set of shift vectors for any voxel that lies on a line connecting the two fiducials. Likewise, add a third noncolinear fiducial to the set of anchor points, and a mapping can be defined that relates the voxels which lie in a plane created by the three fiducials. The complete, three-dimensional data set that defines the linear shifts relating each voxel in data set A to its companion voxel in data set B (or mapping data A into data B) is itself a 3-D array, each element being a 3-D shift vector, and is completely defined by four fiducials. These shifts in separate dimensions are linear and separable, allowing the mapping function to be treated as three separate three-dimensional arrays, each element consisting of the linear shift in the appropriate dimension, x, y, or z. Once the complete mapping function is defined, based on four fiducials, the data sets are registered: for any voxel in data set A the corresponding mapping vector, ($\delta_{xn}$, $\delta_{yn}$, $\delta_{zn}$), is applied to accesses the companion voxel in data set B, and the two voxels are compared.

B. Analytical Formalism

In order to treat the mapping function of each spatial dimension separately, let α=x, y, or z. Again, for any voxel, ($X_A$, $Y_A$, $Z_A$) in data set A, there is an α-map that relates that voxel to its companion in data set B. It is possible to define an α-mapping for every point in the 3D space that is data set A based on four fiducials, (which do not lie in a plane). Specifically, four fiducial-voxels in data set A are selected:

$$F_{A1} = (x_{A1}, y_{A1}, z_{A1})$$

$$F_{A2} = (x_{A2}, y_{A2}, z_{A2})$$

$$F_{A3} = (x_{A3}, y_{A3}, z_{A3}), \text{ and}$$

$$F_{A4} = (x_{A4}, y_{A4}, z_{A4}) \qquad (1)$$

The companion voxels are identified in data set B:

$$F_{B1}=(x_{B1},y_{B1},z_{B1})$$

$$F_{B2}=(x_{B2},y_{B2},z_{B2})$$

$$F_{B3}=(x_{B3},y_{B3},z_{B3}), \text{ and}$$

$$F_{B4}=(x_{B4},y_{B4},z_{B4}) \quad (2)$$

With these four fiducials, the set of shifts are defined:

$$\delta_{x1}=x_{B1}-x_{A1} \; \delta_{y1}=y_{B1}-y_{A1} \; \delta_{z1}=z_{B1}-z_{A1}$$

$$\delta_{x2}=x_{B2}-x_{A2} \; \delta_{y2}=y_{B2}-y_{A2} \; \delta_{z2}=z_{B2}-z_{A2}$$

$$\delta_{x3}=x_{B3}\times x_{A3} \; \delta_{y3}=y_{B3}\times y_{A3} \; \delta_{z3}=z_{B3}\times z_{A3}$$

$$\delta_{x4}=x_{B4}+x_{A4} \; \delta_{y4}=y_{B4}+y_{A4} \; \delta_{z4}=z_{B4}+z_{A4} \quad (3)$$

The definitions of (1), (2), and (3) allow us to map any voxel in data set A, $(X_{An}, Y_{An}, Z_{An})$, to its companion in data set B, by solving the following equation for $\delta_{an}$:

$$A_\alpha x_{An}+B_\alpha y_{An}+C_\alpha z_{An}+D_\alpha \delta_{an}+E_\alpha=0 \text{ for } \alpha=x, y, \text{ or } z \quad (4)$$

Where $A_\alpha$, $B_\alpha$, $C_\alpha$, $D_\alpha$, and $E_\alpha$ are the following determinants:

$$A_\alpha = \begin{vmatrix} 1 & y_{A1} & z_{A1} & \delta_{\alpha 1} \\ 1 & y_{A2} & z_{A2} & \delta_{\alpha 2} \\ 1 & y_{A3} & z_{A3} & \delta_{\alpha 3} \\ 1 & y_{A4} & z_{A4} & \delta_{\alpha 4} \end{vmatrix}, B_\alpha = \begin{vmatrix} x_{A1} & 1 & z_{A1} & \delta_{\alpha 1} \\ x_{A2} & 1 & z_{A2} & \delta_{\alpha 2} \\ x_{A3} & 1 & z_{A3} & \delta_{\alpha 3} \\ x_{A4} & 1 & z_{A4} & \delta_{\alpha 4} \end{vmatrix},$$

$$C_\alpha = \begin{vmatrix} x_{A1} & y_{A1} & 1 & \delta_{\alpha 1} \\ x_{A2} & y_{A2} & 1 & \delta_{\alpha 2} \\ x_{A3} & y_{A3} & 1 & \delta_{\alpha 3} \\ x_{A4} & y_{A4} & 1 & \delta_{\alpha 4} \end{vmatrix}, D_\alpha = \begin{vmatrix} x_{A1} & y_{A1} & z_{A1} & 1 \\ x_{A2} & y_{A2} & z_{A2} & 1 \\ x_{A3} & y_{A3} & z_{A3} & 1 \\ x_{A4} & y_{A4} & z_{A4} & 1 \end{vmatrix}, \text{ and}$$

$$E_\alpha = -\begin{vmatrix} x_{A1} & y_{A1} & z_{A1} & \delta_{\alpha 1} \\ x_{A2} & y_{A2} & z_{A2} & \delta_{\alpha 2} \\ x_{A3} & y_{A3} & z_{A3} & \delta_{\alpha 3} \\ x_{A4} & y_{A4} & z_{A4} & \delta_{\alpha 4} \end{vmatrix}.$$

Equation (4) is an extension of the expression for a plane based on three known points, but extended to another dimension.

C. Numerical Analysis in Two Dimensions

Figure 3:
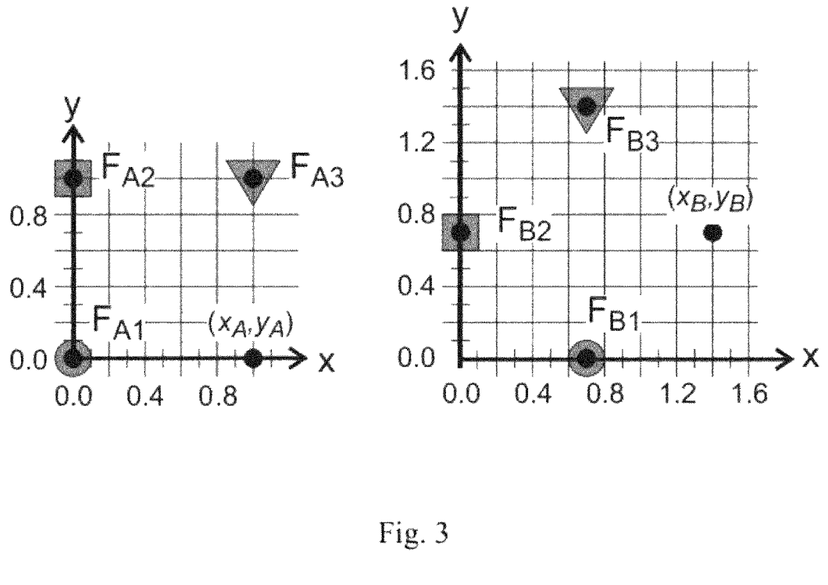
FIG. 3 is a theoretical 2D illustration of an exemplary registration data taken from two different, widely displaced, aspect angles.

Now consider a simple example of the mapping technique in two dimensions. FIG. 3 shows four points arranged in a square, as seen from two different viewing angles, separated by 45°. The mapping function(s) will be treated as two two-dimensional arrays, one for each spatial dimension. The set of $\alpha$-shifts, where $\alpha=x, y$, lie in a plane and can be completely determined by three (noncolinear) points, or fiducials. Specifically, three fiducial pixels are selected for data set A:

$$F_{A1}=(X_{A1},y_{A1})=(0,0),$$

$$F_{A2}=(X_{A2},y_{A2})=(0,1), \text{ and}$$

$$F_{A3}=(X_{A3},y_{A3})=(1,1). \quad (5)$$

The companion pixels are identified in data set B:

$$F_{B1} = (x_{B1}, y_{B1}) = \left(\frac{1}{\sqrt{2}}, 0\right), \quad (6)$$

$$F_{B2} = (x_{B2}, y_{B2}) = \left(0, \frac{1}{\sqrt{2}}\right), \text{ and}$$

$$F_{B3} = (x_{B3}, y_{B3}) = \left(\frac{1}{\sqrt{2}}, \frac{2}{\sqrt{2}}\right).$$

With these three fiducials, the set of shifts are defined as follows:

$$\delta_{x1} = x_{B1} - x_{A1} = \frac{1}{\sqrt{2}}, \; \delta_{y1} = y_{B1} - y_{A1} = 0, \quad (7)$$

$$\delta_{x2} = x_{B2} - x_{A2} = 0, \; \delta_{y2} = y_{B2} - y_{B2} = \frac{1}{\sqrt{2}} - 1,$$

$$\delta_{x3} = x_{B3} - x_{A3} = \frac{1}{\sqrt{2}} - 1, \; \delta_{y3} = y_{B3} - y_{A3} = \frac{2}{\sqrt{2}} - 1.$$

The key to understanding the registration algorithm of the present disclosure is to realize that for a single dimension ($\alpha=x, y$), the shifts defined in (7) lie on a plane in the coordinate system of ($x_A, y_A, \delta_x$). That plane is defined by three points, hence the need for three fiducials. The plane is defined, from definitions (5), (6), and (7) by $$A_\alpha x_{An}+B_\alpha y_{An}+C_\alpha \delta_{an}+D_\alpha=0 \text{ for } \alpha=x,y, \quad (8)$$

where $A_\alpha$, $B_\alpha$, $C_\alpha$, and $D_\alpha$ are the following determinants:

$$A_\alpha = \begin{vmatrix} 1 & y_{A1} & \delta_{\alpha 1} \\ 1 & y_{A2} & \delta_{\alpha 2} \\ 1 & y_{A3} & \delta_{\alpha 3} \end{vmatrix}, B_\alpha = \begin{vmatrix} x_{A1} & 1 & \delta_{\alpha 1} \\ x_{A2} & 1 & \delta_{\alpha 2} \\ x_{A3} & 1 & \delta_{\alpha 3} \end{vmatrix},$$

$$C_x = \begin{vmatrix} x_{\alpha 1} & y_{A1} & 1 \\ x_{\alpha 2} & y_{A2} & 1 \\ x_{\alpha 3} & y_{A3} & 1 \end{vmatrix}, \text{ and } D_x = -\begin{vmatrix} x_{A1} & y_{A1} & \delta_{\alpha 1} \\ x_{A2} & y_{A2} & \delta_{\alpha 2} \\ x_{A3} & y_{A3} & \delta_{\alpha 3} \end{vmatrix}.$$

This plane, or mapping function, can be used to map any pixel in data set A, $(X_{An}, y_{An})$, to its companion in data set B, by solving equation (8) for $\delta_{an}$. Substitution of (5), (6) and (7) into (8) yields $$\left(\frac{1}{\sqrt{2}} - 1\right)x_{An} + \frac{-1}{\sqrt{2}}y_{An} - \delta_{xn} + \frac{1}{\sqrt{2}} = 0. \quad (9)$$

Similarly, for the y-shift, substitution into (8) yields $$\frac{1}{\sqrt{2}}x_{An} - \left(\frac{1}{\sqrt{2}} - 1\right)y_{An} - \delta_{yn} = 0. \quad (10)$$

Figure 4:
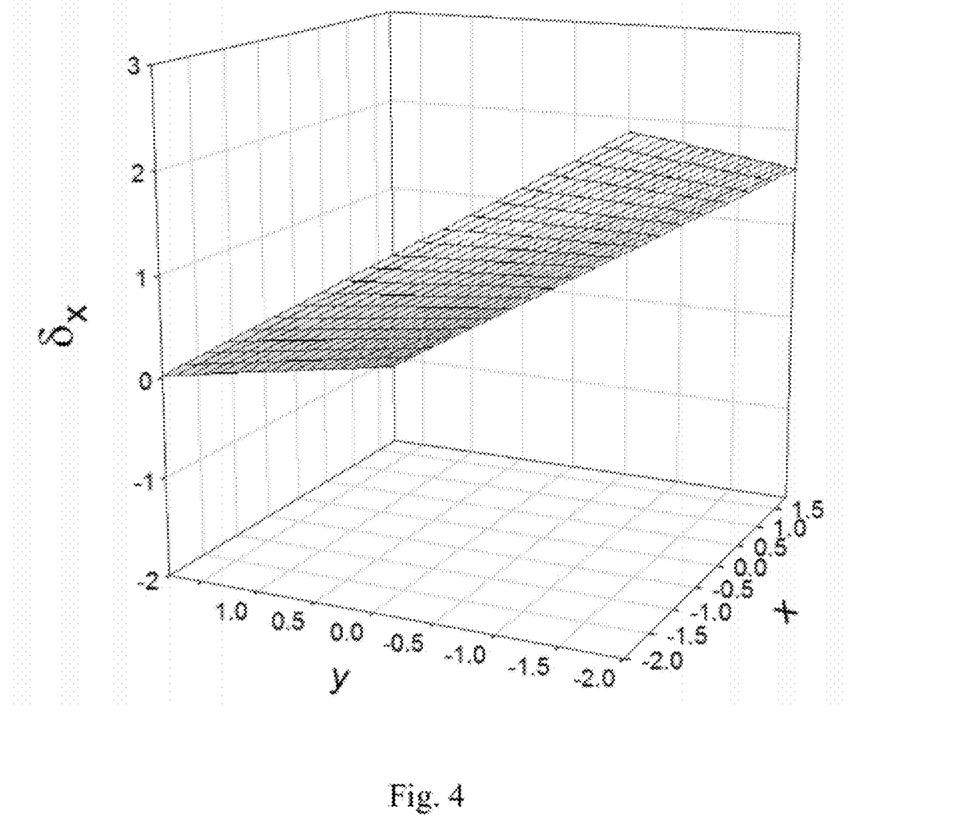
FIG. 4 is a graphical representation of an exemplary mapping function for the x-dimension in the 2D example. For any point in the 2D space that is data set A, the map gives the $\delta_x$-shift to locate the companion pixel in data set B.
Figure 5:
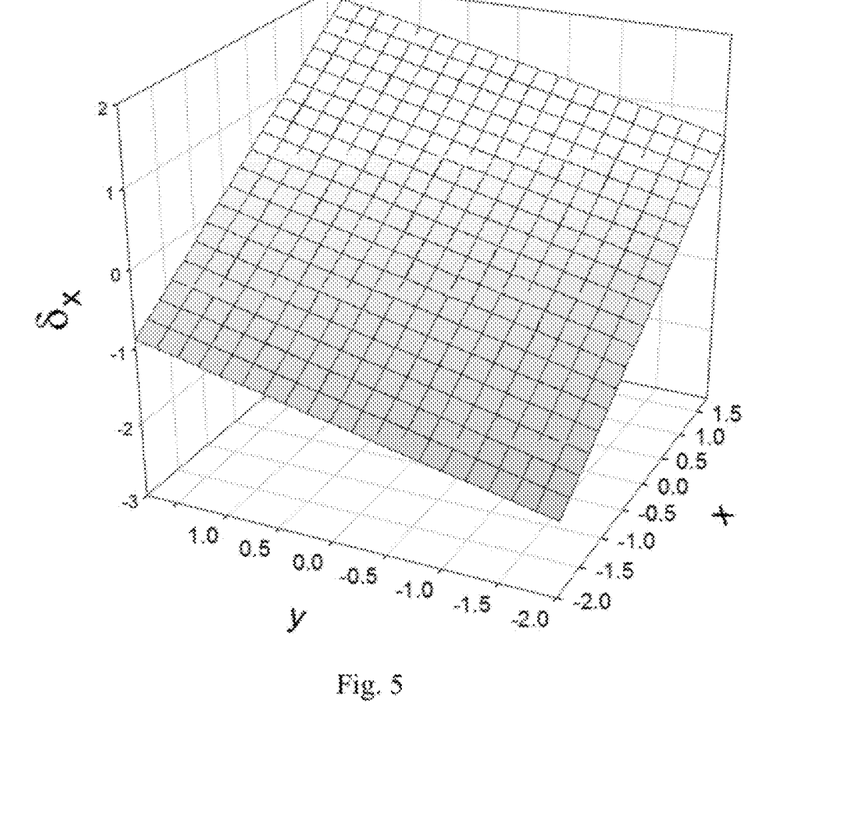
FIG. 5 is a graphical representation of an exemplary mapping function for the y-dimension in the 2D example. For any point in the 2D space that is data set A, the map gives the $\delta_y$-shift to locate the companion pixel in data set B.

Equation (9) and (10), shown graphically in FIGS. 4 and 5, completely describe the mapping between the two data sets. To demonstrate, consider $(x_A, yA)=(1, 0)$. The companion pixel location in data set B is determined by calculating the shift vector using (9) and (10), or $$(\delta_x, \delta_y) = \left(\frac{2}{\sqrt{2}} - 1, \frac{1}{\sqrt{2}}\right). \quad (11)$$

The companion pixel location is therefore, $$(x_B, y_B) = (1 + \delta_x, 0 + \delta_y) = \left(\frac{2}{\sqrt{2}}, \frac{1}{\sqrt{2}}\right).$$

The algorithm demonstrated in this 2D example is readily expandable to the third dimension, although the mapping functions become more difficult to visualize. Equation (4) is used to gain access to a voxel's companion in the second data set, the voxels are compared and the appropriate action taken.

For analytical data, such as in this 2D example, the mapping created using equation (4) can be shown to be an exact mapping, however, the same cannot be said of experimental data. Measurement uncertainty associated with processed laser radar data introduces error in the mapping, both in object location and fiducial selection. With the exemplary embodiments as disclosed the impact of this measurement error on the final registration is minimized through the inclusion of additional fiducials into the registration process and by application of an automatic fine adjustment algorithm after manual fiducial selection is complete.

D. Incorporating Additional Fiducials for Registration of 3D Experimental Data The mapping function is calculated by estimating a "surface" in three dimensions based on four, experimentally obtained points. Just as with the estimation of any curve with experimental data, the process is subject to error from measurement uncertainty. To try to improve the situation, additional experimental data can be incorporated and a curve estimated through some technique such as least squares approximation. In the same way, measurement uncertainty associated with the laser radar data introduces error into the mapping function. Unfortunately, additional error is inserted into the process during the fiducial selection process, since even small physical structures may span several voxels of data. For some experimental conditions, the inventors have observed that relatively small errors in manual fiducial location selection can significantly degrade the registration, particularly for regions far from the selected fiducials.

To address this issue, means of incorporating additional fiducials are included into the mapping calculation. One way of doing this is to assume that all point pairs are equally valid, and to compute a set of space maps based on each possible combination of four point pairs. The space maps are then averaged together to produce a composite map, i.e., $$\vec{\delta}(x, y, z) = \frac{\vec{\delta}^1(x, y, z) = \vec{\delta}^2(x, y, z) + \ldots + \vec{\delta}^n(x, y, z)}{N} \quad (12)$$

where N is the total number of combinations of four point pairs and the superscript refers to the individual combinations.

This method quickly becomes computationally intensive as fiducial point pairs are added. However, much of the computation can be avoided by recognizing that the space maps can be combined before the $\delta$ vector for each point in the 3-D space is calculated. Solving equation (4) for $\delta$ yields:

$$\delta_\alpha(x, y, z) = \frac{A_\alpha x + B_\alpha y + C_\alpha z - E_\alpha}{-D_\alpha} \quad (13)$$

Equation (13) holds for any given combination of four fiducial point pairs. Combinations of four point pairs and the resulting constants A, B, C, D, and E will be designated using a superscripted integer I where I=1 to $_nC_4$, and n is the total number of fiducial point pairs. Therefore, $$\delta_\alpha^I(x, y, z) = \frac{A_\alpha^I x + B_\alpha^I y + C_\alpha^I z - E_\alpha^I}{-D_\alpha^I}. \quad (14)$$

The equation can then be restated in the form, $$\delta_\alpha^I(x, y, z) = -\frac{A_\alpha^I}{D_\alpha^I} x - \frac{B_\alpha^I}{D_\alpha^I} y - \frac{C_\alpha^I}{D_\alpha^I} z + \frac{E_\alpha^I}{D_\alpha^I}, \quad (15)$$

which allows the average components of $\delta$ to be computed by:

$$\frac{1}{N} \sum_{I=1}^{N} \delta_\alpha^I(x, y, z) = \quad (16)$$

$$\frac{1}{N} \left[ -\left(\sum_{I=1}^{N} \frac{A_\alpha^I}{D_\alpha^I}\right) x - \left(\sum_{I=1}^{N} \frac{B_\alpha^I}{D_\alpha^I}\right) y - \left(\sum_{I=1}^{N} \frac{C_\alpha^I}{D_\alpha^I}\right) z + \sum_{I=1}^{N} \frac{E_\alpha^I}{D_\alpha^I} \right],$$

where $N = {_nC_4}$. This method allows the analytic equation for the map to be computed for any number of point pairs with a relatively low computational overhead.

E. Fine Adjust

As with many 3D data registration techniques, a multi-step process is employed to calculate a final 3D data registration, or a course alignment and a fine adjustment. For this technique, consider the process of manually selecting fiducials in each data set as the initial course alignment. It is then possible to proceed through the software to an automatic fine-adjustment stage, which tweaks the registration/combination based on some metric. It has been found through the development of the fine adjustment algorithm that the technique lends itself to a simple and efficient algorithm for fine adjustment based on fiducial perturbation. This is an improvement over other methods of digital registration, in which automatic adjustment is often computationally intensive, involving processes such as exhaustive correlation or surface matching. The simplicity of the fine adjust algorithm employed relies on the fact that for a given set of fiducial point pairs, the best possible mapping, and therefore registration, will occur from the most correctly chosen fiducial points. The technique is computationally efficient because the mapping function is altered through fiducial perturbation, as opposed to shifting the data sets with respect to each other. A one-dimensional fiducial perturbation may result in some combination of multi-dimensional translation and rotation between the data sets.

Consider the fiducial sets given in equations (1) and (2). The fine adjust technique involves perturbing each fiducial point in data set B one pixel in each direction. After each perturbation, the data sets are registered in accordance with the resulting mapping function, and a metric of registration effectiveness is calculated. The perturbation having the greatest positive effect on the registration is executed and the process is repeated. The efficiency of the algorithm is greatly enhanced by applying individual limits to the extent of perturbation for a given fiducial. For instance, the operator can include a confidence rating upon fiducial selection, prohibiting the algorithm from perturbing a fiducial point beyond some bound. Similarly, the program can initiate perturbation on fiducials points with lower confidence levels. Choosing a quantitative measure of the effectiveness of registration is not trivial, but it has been found effective to minimize logically NORed data sets for local areas of interest.

Experimental Results

Figure 6A:
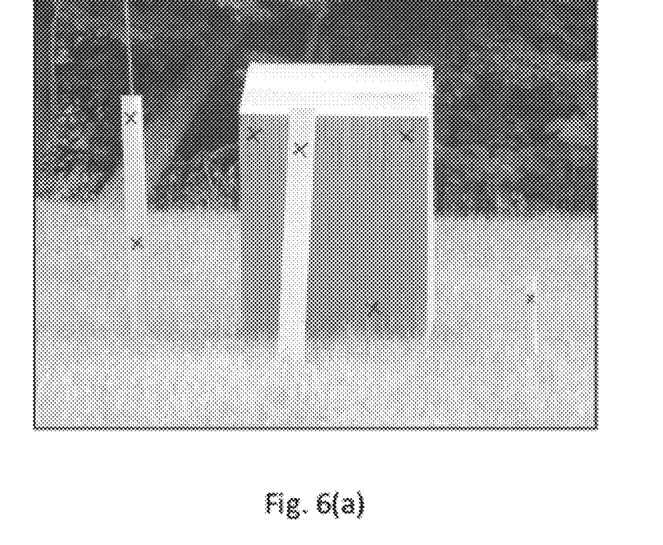
FIG. 6a shows an exemplary arrangement of items for experimental results from perspective A. The 1 by 4 board occludes a portion of the box.
Figure 6B:
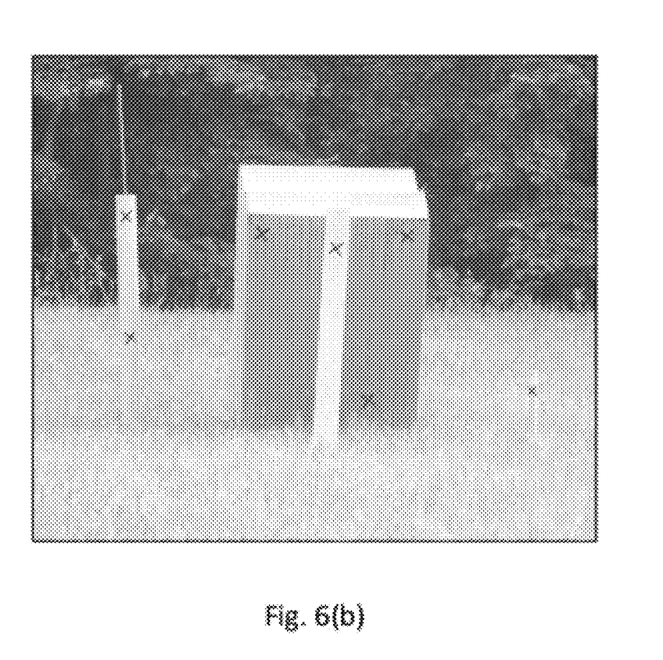
FIG. 6b shows an exemplary occluded object from perspective B.
Figure 7A:
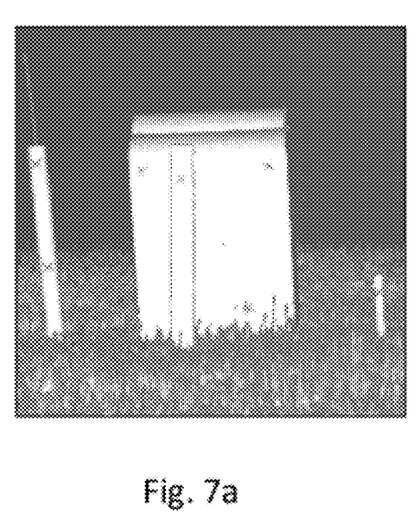
FIGS. 7a through d are exemplary laser radar data displayed as intensity mappings of the test objects, a) from perspective A, b) from perspective B, c) from perspective A with occluder gated out and d) from perspective B with occluder gated out.
Figure 7B:
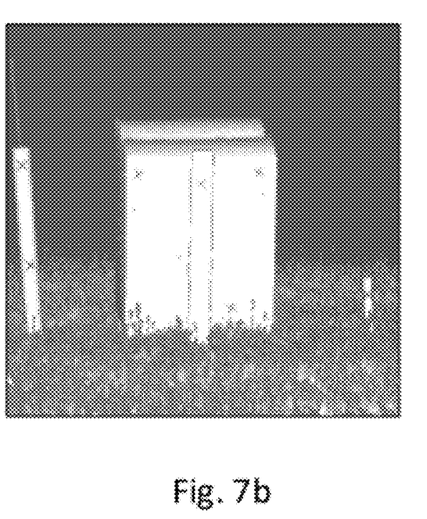
Figure 7C:
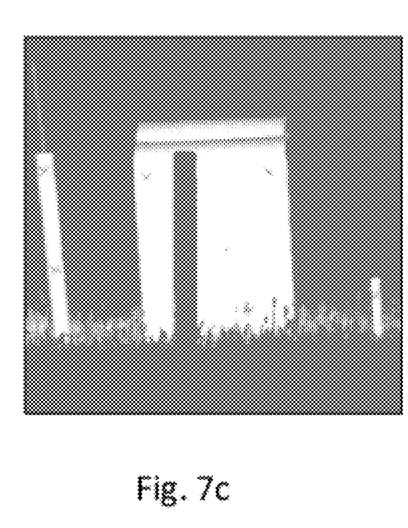
Figure 7D:
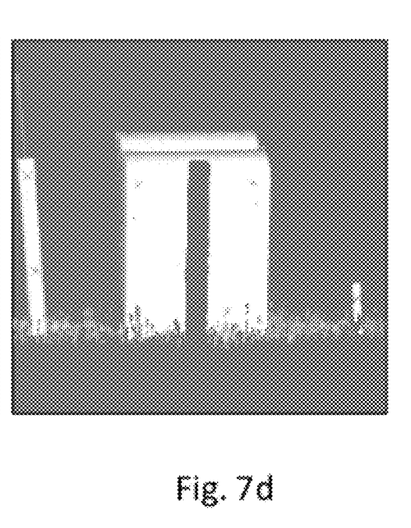
Figure 8A:
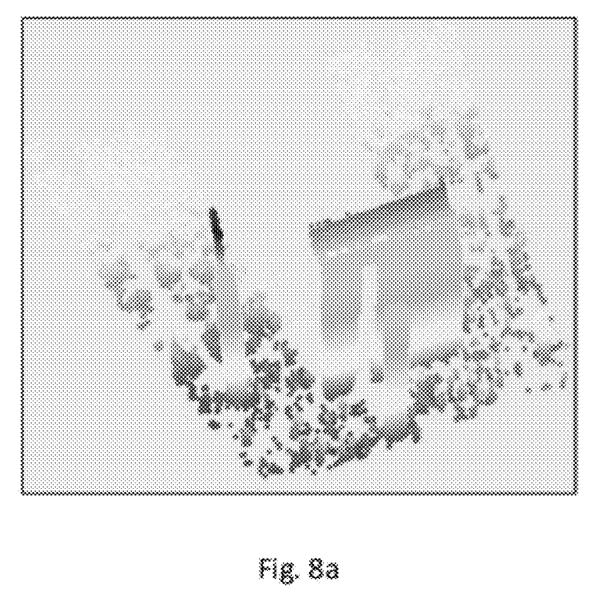
FIGS. 8a and 8b are exemplary point cloud renderings rotated by computer of the laser radar data for a) perspective A, b) perspective B.
Figure 8B:
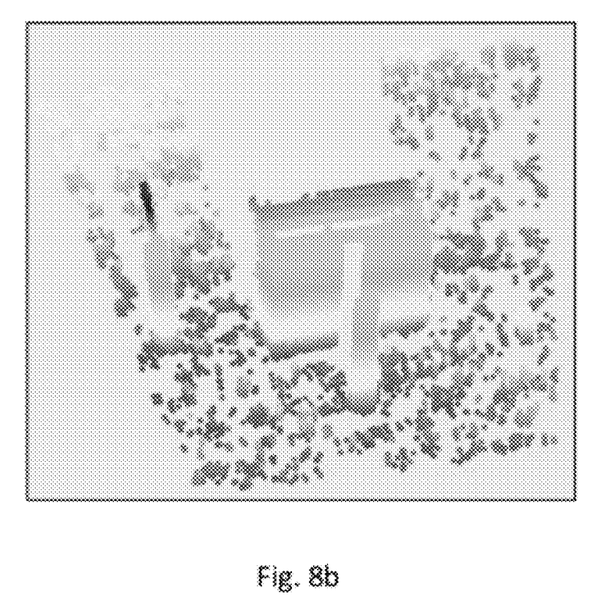

The exemplary registration algorithm as disclosed was experimentally verified through a computer acquisition of laser radar data of a simple situation involving an occluded object from two different acquisition positions, again as depicted graphically in FIG. 1a. The object of this experiment is a cardboard box, approximately 66 cm wide, 93 cm tall and 61 cm deep, shown from the two acquisition perspectives in FIGS. 6a and b. The distance from the laser radar to the box is about 15.8 meters. An unpainted wooden 1 by 4 board, measuring approximately 8.6 cm wide and 93 cm in height is placed approximately 80 cm in front of the target to act as an occluder. Small black 'x's have been placed on the box and board to offer convenient fiducials for registration. Several other items with fiducial marks have been placed in the field of view, offering an array of choices for fiducial points. Horizontal and vertical scan voltages corresponding to a full-angle scan of approximately 112 mrad and scan step sizes of 437 jarad were used for this data acquisition. The return signal was digitized at 2 GS/s, offering a sampling resolution corresponding to about 7.5 cm. The measured multiple-pulse range resolution for the system is closer to 15 cm. Two laser radar data collections were conducted of this scene from positions separated by approximately 205 cm (260 mrad). The laser radar data from each perspective was displayed as a two-dimensional intensity map in FIGS. 7a and b. FIGS. 7c and d show range-gated versions of the 3D data where the 1 by 4 board was gated out of the intensity mapping. As expected, the occlusion leaves a shadow on the target in each data collection. The relative positions of the objects in the scene, along with their respective shadows, are easier to see with a 3D point cloud rendering, as shown in FIGS. 8a and b. These point cloud representation have been rotated by computer to emphasize the portions of the scene in which data is missing, i.e. the shadow left by the occlusion on the front surface of the box. Note that the box itself, (as well as the other stakes), creates its own shadow occluding some of the ground information.

Figure 9:
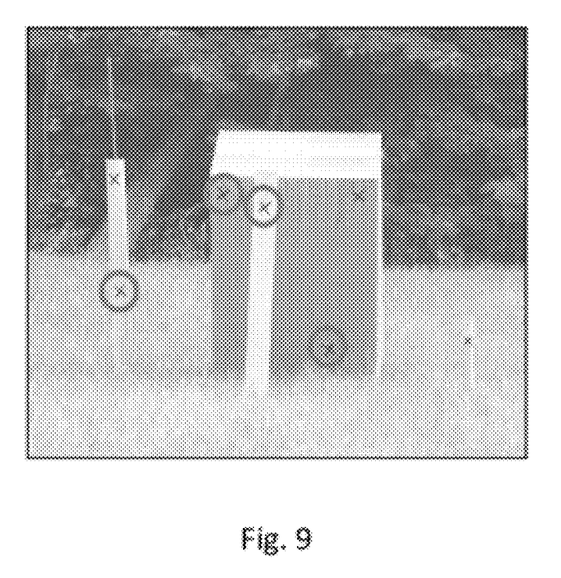
FIG. 9 shows an exemplary target wherein the fiducials used in the registration algorithm are indicated by circles.

As FIGS. 7c and 8a clearly indicate, data pertaining to the obscured portion of the surface of the box is not present in the laser radar data from the first perspective. However, that information is present in the data collection taken from perspective B. Likewise, data missing from aspect B is present in laser radar data A. Through 3-D data registration and combination, a full representation of the front surface of the box is possible. Following the mathematical procedure outlined in this specification, four fiducial point pairs are manually selected in each data set. These fiducials are indicated on FIG. 9 with circles. The data sets are registered and the fine adjust algorithm is applied. For this application, (combining multiple-aspect laser radar data), data voxels are accumulated after registration through companion voxel intensity comparison. The voxel with the maximum intensity is saved into a solution data set.

Figure 10:
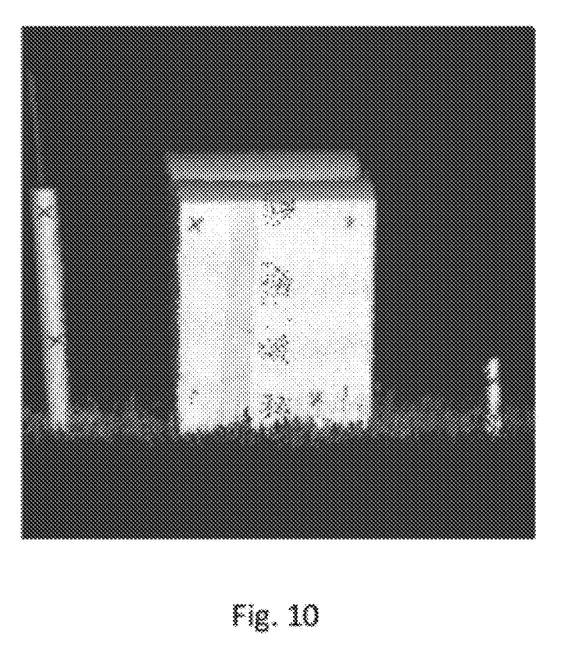
FIG. 10 shows exemplary registered and combined 3D laser radar data displayed as a range-gated intensity map, consistent with the display parameters of FIG. 7d).
Figure 11A:
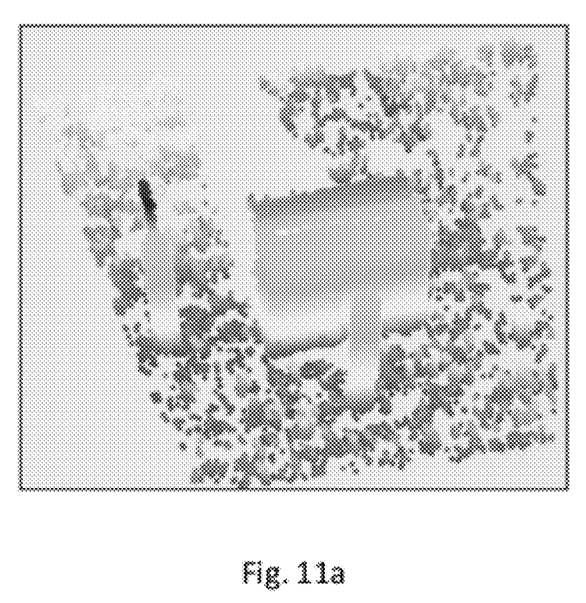
FIG. 11a is an exemplary point cloud representation of the scene with data from perspectives A and B registered and combined.
Figure 11B:
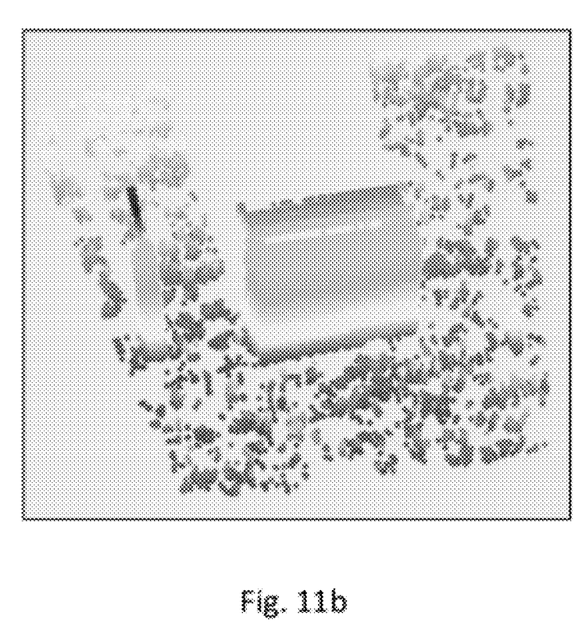
FIG. 11b is an exemplary point cloud representation of the target area recorded with the central board physically removed from the scene. Display parameters are identical to that of FIG. 8 b).

The results of this registration and combination, based on the technique, are given in FIGS. 10 and 11. The identical display parameters are used in FIG. 10 as in 7d, for comparison. Nearly all of the missing data, lying in the shadow in FIG. 7d, have been accumulated in the registration/combination processing and are displayed in the new data set. Similarly, a point cloud rendering of the combined data is shown in FIG. 11a, using display parameters consistent with FIG. 8b. For comparison purposes, the central occluding board (see FIG. 6) was physically removed and a laser radar data acquisition of the target area from position B was conducted. This data is shown in FIG. 11b. It is interesting to note that not only is the surface of the box reconstructed in FIG. 11a, the registered and combined image, but some data lying in the shadow behind the box has been filled in as well in the processed image.

Next, the effectiveness of incorporating additional fiducial pairs into the mapping for experimental cases was investigated where the accuracy of one or more fiducial pairs is questionable. The strategy was to replace one of the four fiducials in the above example with a haphazardly chosen fiducial point pair, and calculate a metric of registration effectiveness. As mentioned previously, selecting a metric for registration effectiveness is not trivial, and can be data dependant. For this experiment, it was thought that a reasonable metric might involve comparing the box face for registered/combined data (such as that shown in FIG. 11a) with the unobscured case, shown in FIG. 11b. Specifically, for this experiment the processed data and the unobscured data on a voxel-by-voxel basis, for a 12 bin (90 cm) range gate centered on the face of the box was logically NORed. This process essentially counts the discrepancies between the data sets, so a lower count represents a better registration.

Figure 12:
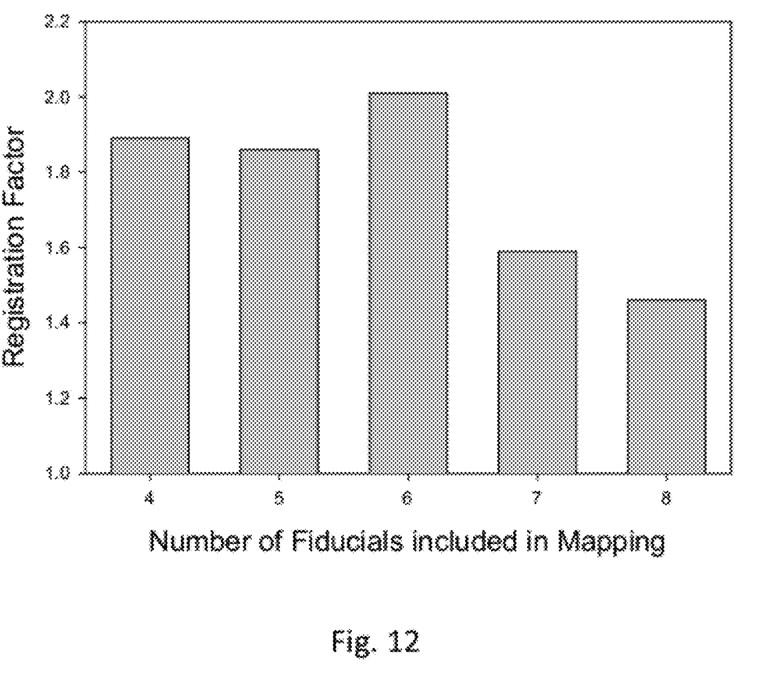
FIG. 12 shows exemplary graphical results of registration/combination using additional fiducials. The horizontal axis shows the number of fiducials used to calculate the mapping function. The vertical axis shows the number of discrepancy voxels between the combined data and the unobscured data, calculated by a logical NOR.

A significant number of discrepancies will exist in the data due solely to the measurement uncertainty (primarily range uncertainty) inherent in the laser radar data. To baseline this effect, two experimental laser radar data acquisitions of identical scenes were taken and applied to the metric. This operation resulted in a discrepancy voxel count of 5,977'. This number is meaningless by itself, but is used as a baseline for the data to follow. Starting with three well-chosen and one haphazardly-chosen fiducial point pairs, fiducial pairs were added one at a time. The registration/combination algorithm was applied and metric calculated with each additional fiducial. The results of incorporating additional fiducials to a four fiducial pair mapping with known error are shown in FIG. 12. For example, FIG. 12 shows exemplary results of registration/combination using additional fiducials. The horizontal axis shows the number of fiducials used to calculate the mapping function. The vertical axis shows a factor corresponding to the efficacy of the registration. A value of 1 represents nearly perfect registration, while completely unregistered data will rank about 2.5. The baseline value of near 6,000 counts is used as the lowest value on the vertical scale. One can see from the graph that in almost every case, the registration was enhanced with the addition of a fiducial point pair. Finally, the fine adjust routine was applied to the eight-point mapping, automatically correcting the erroneously chosen fiducial point pair. The resulting discrepancy voxel count is shown on the bar graph as a dashed line at 10,344.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

What is claimed is:

1. A registration algorithm to process 3D laser radar data sets using a computing device to map obscured objects based on fine adjustments to the 3D data registration, comprising:

defining fiducials based on an imaged reference point identifiable in each data set;

using the fiducials as anchor points to create a digital mapping relating two or more data sets; and defining a three-dimensional linear shift vector for each data voxel to allow fine adjustments to the 3D data registration and improve target-identification of an obscured target, wherein said fine adjustments to the 3D data registration are based on fiducial perturbation without having to shift data sets relative to each other with respect to various degrees of freedom.

2. The registration algorithm according to claim 1, wherein the fiducials are visually selected from each data set as an initial course alignment.

3. The registration algorithm according to claim 1, wherein four fiducials are used to define the mapping for a three-dimensional space.

4. A 3D laser radar system based on a laser transceiver sensor system, comprising:

producing nominal pulses of laser from a microchip towards scanners, the scanners being computer controlled to scan a monostatic transceiver field of view directed towards a scene having an obscured target, wherein said scanning yields at least one data set relating to said obscured target acquired from one location during one time period, and another data set relating to said obscured target acquired from another location during another time period;

reflecting a returning radiation from the scene by a polarization beam splitter for focusin on a preamplifier module, wherein a post-amplifier further amplifies the output of the preamplifier module;

digitizing said amplified output for input t a computing device to acquire data from differing aspect angles;

computer processing data. from one 3D imaging laser radar location at one aspect angle, wherein the target is obscured such that some amount of laser radiation passes through and scatter at the target;

identifying the target by accumulating one data set acquired from said one 3D imaging laser radar location based on said laser radiation scattered at the target, resulting in a limited number of target-voxels;

computer processing another data set from another 3D imaging laser radar location at another aspect angle, wherein the target obscuration from said another aspect angle is such that another amount of another laser radiation passes through another set of gaps and scatter differently at the target;

identifying the target by accumulating said another data set acquired from said another 3D imaging laser radar location, resulting in a differing number of target-voxels in the another data set; and as target-voxels from different data acquisitions are registered and accumulated, constructing a complete 3D representation of the obscured target, wherein the 3D representation of the obscured target acquired from differing aspect angles improves identification of the obscured target.

5. The 3D laser radar system according to claim 4, comprising:

a telescope having a filter at an entry aperture capable of blocking said nominal pulses of laser diode;

a diverging lens and a primary lens, along with said polarization beam splitter, being disposed in an optical path of the telescope; and a quarter wave plate disposed at an output end of said telescope and in an optical path before towards said scanners.

6. The 3D laser radar system according to claim 4, wherein said obscured target is obscured by a foliage canopy or camouflage net.

7. The 3D laser radar system according to claim 4, wherein said another data set from said another aspect angle of said another 3D imaging laser radar obtains another pass through another set of holes in a foliage, resulting in another independent collection of target voxels.

8. The 3D laser radar system according to claim 4, wherein fiducials are selected from each data set based on physical data points that are easily recognizable in both data sets.

9. The 3D laser radar system according to claim 4, wherein a fine adjustment is applied to a digital mapping process based on fiducial perturbation.

* * * * *